(12) United States Patent
Epstein et al.

(10) Patent No.: US 6,889,219 B2
(45) Date of Patent: May 3, 2005

(54) METHOD OF TUNING A DECISION NETWORK AND A DECISION TREE MODEL

(75) Inventors: Mark E. Epstein, Katonah, NY (US); Jerome L. Quinn, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 10/054,051

(22) Filed: Jan. 22, 2002

(65) Prior Publication Data

US 2003/0140018 A1 Jul. 24, 2003

(51) Int. Cl.$^7$ ............................. G06F 17/00; G06N 5/00
(52) U.S. Cl. .............................. 706/45; 706/46; 706/14
(58) Field of Search ............................... 706/45, 46, 14

(56) References Cited

U.S. PATENT DOCUMENTS 6,510,406 B1 * 1/2003 Marchisio ....................... 704/9
2002/0138492 A1 * 9/2002 Kil .............................. 707/100

OTHER PUBLICATIONS

Stefania Gentili, Information Update on Neural Tree Networks, Oct. 2001, IEEE, 0–7803–6725–1/01, 505–508.*
Mukund Padmanabhan, Partitioning the Feature Space of a Classifier with Linear Hyperplanes, IEEE, 1063–6676/99, 282–288.*

* cited by examiner

Primary Examiner—Anthony Knight
Assistant Examiner—Joseph P. Hirl
(74) Attorney, Agent, or Firm—Akerman Senterfitt (57) ABSTRACT

A method of tuning a decision network can include a series of steps. The steps can include identifying a deviation between a correct interpretation of a data item and an incorrect interpretation of the data item. In a decision network including a hierarchical set of nodes and leaves, a path of traversed nodes in the decision network resulting in the deviation can be determined. The nodes can correspond to queries. A measure of goodness at a node in the path can be calculated using at least one new query as a replacement for an existing query to determine whether the measure of goodness improves using the new query compared to the old query. If the measure of goodness improves, at least one new query can be selected and the decision network can be regrown from the node down through the leaves using the at least one new query at the node.

29 Claims, 4 Drawing Sheets

METHOD OF TUNING A DECISION NETWORK AND A DECISION TREE MODEL

BACKGROUND OF THE INVENTION

1. Technical Field

This invention relates to systems based upon discrete probability distributions, and more particularly, to a method of tuning a decision network and a decision tree for use within a discrete probability distribution system.

2. Description of the Related Art

An increasing number of computer-based systems utilize models based upon discrete probability distributions. Such systems are capable of processing data and producing one or more possible discrete outputs. Discrete probability distribution systems stand in contrast to systems based upon continuous probability distributions. Examples of discrete probability distribution systems can include, but are in no way limited to, natural language understanding systems, speech processing systems, or any other system having an information processing capability which can produce one or more discrete outputs.

Discrete probability distribution systems can be modeled using a hierarchy of queries, also referred to as a decision tree model. The queries of the decision tree model can be directed to any of a variety of aspects concerning the data depending upon the particular domain of the data. Those skilled in the art will recognize that the actual queries, in addition to the placement of each query within the decision tree model, can significantly influence the effectiveness of the model. As a result, system designers constantly refine decision tree models in an effort to develop more robust systems.

Conventional methods of tuning or debugging decision tree models require repeated regression testing. For example, interpretations derived by the discrete probability distribution system can be compared to one or more known correct interpretations or truths. The deviation between the system determined interpretation and the truth can provide developers with insight as well as a measure of the accuracy of the particular decision tree model. Accordingly, the developer then can determine features of the processed data which likely caused the decision tree model to develop incorrect interpretations. Having identified one or more possible features, the developer can formulate a query to detect the identified feature or features. The query can be added to the decision tree model, which then must be retrained. In other words, the new query must be placed within the hierarchy of queries. After the new query is incorporated into the decision tree model, the model again can be tested.

Through continued regression testing, a developer can determine whether the added query improves, decreases, or makes no difference in the system performance. More experienced developers can gain an intuition for identifying features and formulating useful queries. Even experienced developers, however, can select ineffective, or possibly damaging queries. Regardless, each time a potential new query is identified and added to the decision tree model, the entire model must be retrained, statistically smoothed, and retested. Although the time required to complete one iteration of this procedure can vary depending upon the skill of the developer, the size of the test data set, and the processing power of the test machine, oftentimes an iteration can take a minimum of thirty to forty minutes and as long as several days or weeks in some cases.

SUMMARY OF THE INVENTION

The invention disclosed herein concerns a method of tuning a decision network and a decision tree model. Decision tree models can be considered a subset of decision networks, both of which can be used within discrete probability distribution systems. Accordingly, the following discussion is applicable to both decision networks and decision tree models. The invention provides a method and system for fine tuning an existing decision network without first having to retrain the decision network or perform continual regression testing. Paths through the decision network, whether correct or incorrect, leading to various interpretations of data items can be identified. The viability of one or more new queries to be included within the decision network can be evaluated relative to the performance achieved with the existing or old decision network queries. The evaluation of new queries can be performed at selected nodes of the identified paths or at each node comprising the identified paths without first retraining the decision network and testing the model. The invention also can present graphical representations of portions of a decision network, as well as an entire decision network model if suitably sized, within a graphical user interface (GUI). The identified paths through the decision network further can be distinguished within the graphical representation of the decision network using any of a variety of visual identifiers such as patterns or colors. Additional decision network information also can be presented within the GUI.

One aspect of the present invention can include a method of tuning a decision network. The method can include identifying a deviation between a correct interpretation of a data item and an incorrect interpretation of the data item. In a decision network including a hierarchical set of nodes and leaves, a path of traversed nodes in the decision network resulting in the deviation can be determined. The nodes can correspond to queries. A measure of goodness for discrete probability distributions, such as the conditional entropy or the log likelihood, can be calculated at a node in the path using a new query as a replacement for an existing query to determine whether the measure of goodness improves using the new query compared to the old query. For example, the measure of goodness can be calculated at a node that is common to a path resulting in the correct interpretation and common to a path corresponding to the incorrect interpretation. If the measure of goodness improves, the new query can be selected and the decision network can be regrown from the node down through the leaves using the new query at the node. The regrowing step can include statistically smoothing the decision network using smoothing data and subsequently testing the decision network on one or more test data items. The test data items can include characteristics of the original problem data item, data items related to the problem data item, or other data items.

In another embodiment of the invention, if at least two of the plurality of new queries result in an improved measure of goodness, a measure of separation in the decision network can be determined using each of the queries resulting in the improved measure of goodness. For example, queries can be evaluated against a test set of data to determine which query accurately interprets the most data items.

Another aspect of the invention can include a method of tuning a decision network wherein at least a first and a second path of nodes through the decision network are identified. Notably, there can be more than one path through a decision network which can produce a correct and an incorrect interpretation of a data item. The decision network can include a hierarchical set of nodes and leaves wherein the nodes correspond to queries. The first path can produce an incorrect interpretation of a data item; and, the second path can produce a correct interpretation of the data item. A measure of goodness can be calculated at a node in one of the paths using a new query as a replacement for an existing query to determine whether the measure of goodness improves using the new query compared to the old query. If the measure of goodness improves, the new query can be selected and the decision network can be regrown from the node down through the leaves using the new query at the node.

The method can include presenting at least a portion of the decision network or decision tree model in a graphical user interface wherein at least one node from at least one of the paths is distinguished from other nodes of the decision network. For example, at least one node of the first path can be distinguished from at least one node of the second path. A node common to the first and second paths can be distinguished from the other nodes of the decision network. Additionally, decision network information such as query information and training data information can be presented.

Another aspect of the invention can include a method of tuning a decision network wherein a path of nodes traversed through the decision network is identified which results in an interpretation of a data item, whether correct or incorrect. The decision network can include a hierarchical set of nodes and leaves which can correspond to queries. A measure of goodness can be calculated at a node in the path using a new query as a replacement for one of the existing queries. If the new query results in an improved measure of goodness compared to the existing query, the decision network can be retrained using the new query at the node beginning with the node through the leaves of the decision network.

Still, another aspect of the invention can include a graphical user interface configured to display one or more nodes of at least one path in a decision network resulting in a correct interpretation of a data item. The graphical user interface further can be configured to display one or more nodes of at least one path in the decision network resulting in an incorrect interpretation of the data item.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method of tuning a decision network or a decision tree model. As previously mentioned, decision tree models can be considered a subset of decision networks, both of which can be used within discrete probability distribution systems. Accordingly, it should be appreciated that although the following description refers to decision networks, the description is applicable to decision tree models as well. In particular, an existing decision network can be fine tuned or debugged without having to retrain the decision network or perform continual regression testing. The viability of one or more new queries to be included within the decision network can be evaluated relative to the performance achieved with the existing or old decision network queries.

The invention can identify the paths traversed through the decision network for data that, when processed, produces an incorrect interpretation or prediction. Notably, an incorrect interpretation is one in which the discrete output predicted with the greatest probability is known to be incorrect. The invention further can identify correct paths which lead to correct interpretations of the known text wherein the decision network predicts the correct outcome with greatest probability. Nodes of the decision network comprising the identified correct and incorrect paths can be identified as well as the intersection of such nodes. In this manner, the viability of new queries which can replace old queries at nodes along identified paths through the decision network can be evaluated without retraining the model or continual regression testing.

The present invention can be used within any discrete probability distribution system. For example, the present invention can be used within a natural language understanding statistical parser in which parse trees can be built for text. Still, the invention can be used within a speech processing system to determine phonetic baseforms for words with known spellings. Regardless of the particular application or embodiment, the invention can be used in systems having an information processing capability which are capable of producing one or more discrete outputs.

The invention also can present graphical representations of portions of the decision network or the entire decision network within a graphical user interface (GUI). Notably, incorrect paths can be distinguished within the graphical representation of the decision network using any of a variety of visual identifiers. Correct paths resulting in correct interpretations can be distinguished in a like manner. The combination of graphically presenting the aforementioned information and the ability to determine the viability of a new decision network query without the aforementioned overhead can significantly decrease the development time required for writing and debugging decision networks.

Figure 1:
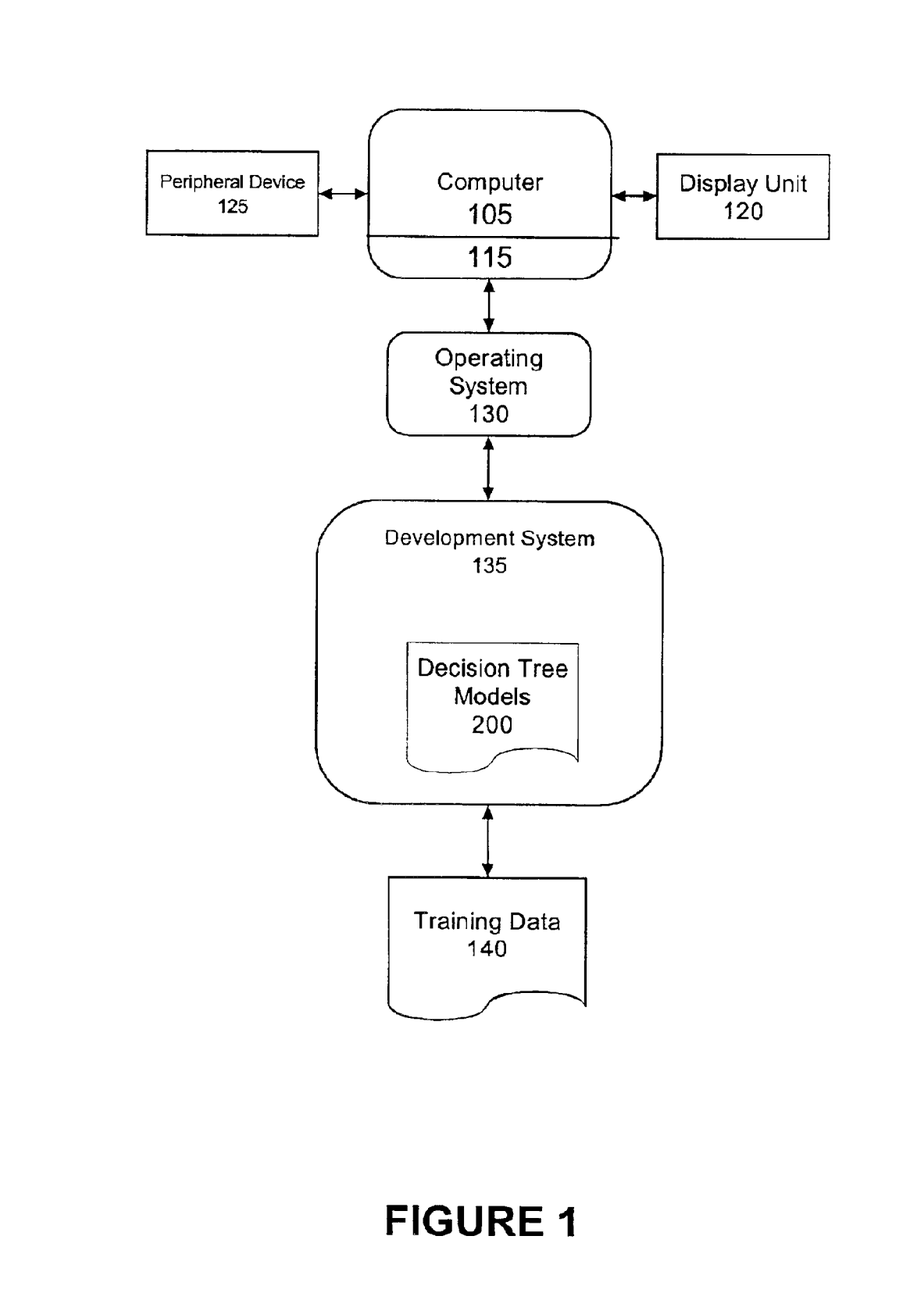
FIG. 1 is a schematic diagram of an exemplary computer system and architecture on which the invention can be used.

FIG. 1 depicts a typical computer system 100 and accompanying computer architecture for use in conjunction with the present invention. The system can include a computer 105 including a central processing unit (CPU), one or more memory devices 115, and associated circuitry. The memory devices 115 can be comprised of an electronic random access memory and a bulk data storage medium. The system also can include a variety of peripheral devices 125 such as a microphone, a mouse, and a keyboard, each operatively connected to the computer system through suitable interface circuitry. A user interface display unit 120 such as a video data terminal can be operatively connected to the computer system 100 through suitable interface circuitry as well. The CPU can be comprised of any suitable microprocessor or other electronic processing unit, as is well known to those skilled in the art. Speakers also can be provided with the system. The various hardware requirements for the computer system as described herein can generally be satisfied by any one of many commercially available high speed computers.

The exemplary computer architecture shown in FIG. 1 can be used for developing a discrete probability distribution data processing system. As shown in FIG. 1, within the memory 115 of computer system 100 can be an operating system 130, a development system 135, and training data 140. The development system 135 can be a development system having a runtime engine capable of analyzing data and formulating predictions for a particular domain. Accordingly, the development system can include suitable tools for building and testing one or more decision networks 200.

In operation, the training data 140 can be analyzed to determine the decision network 200 for extracting meaningful information from the data. Initially, the decision network can be derived from an empirical analysis of the training data. Alternatively, as different statistical model templates are developed, a training corpus can be analyzed by the development system to determine a suitable base statistical model which can be fine tuned. Regardless of how the decision network 200 is first determined, tuning or debugging of the decision network 200 can be performed through a series of regression tests wherein a known data set can be processed.

In FIG. 1, the development system 135 is shown as a single computer program. In that case, the aforementioned components can be realized in a centralized fashion within the computer system 100. It should be noted however that the invention is not limited in this regard, and these various application programs can be implemented as one or more independent computer programs. Moreover, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program in the present context means any expression, in any language, code or notation, of a set of instructions intended to cause a system having an information processing capability to perform a particular function either directly or after either or both of the following a) conversion to another language, code, or notation; b) reproduction in a different material form.

Figure 2:
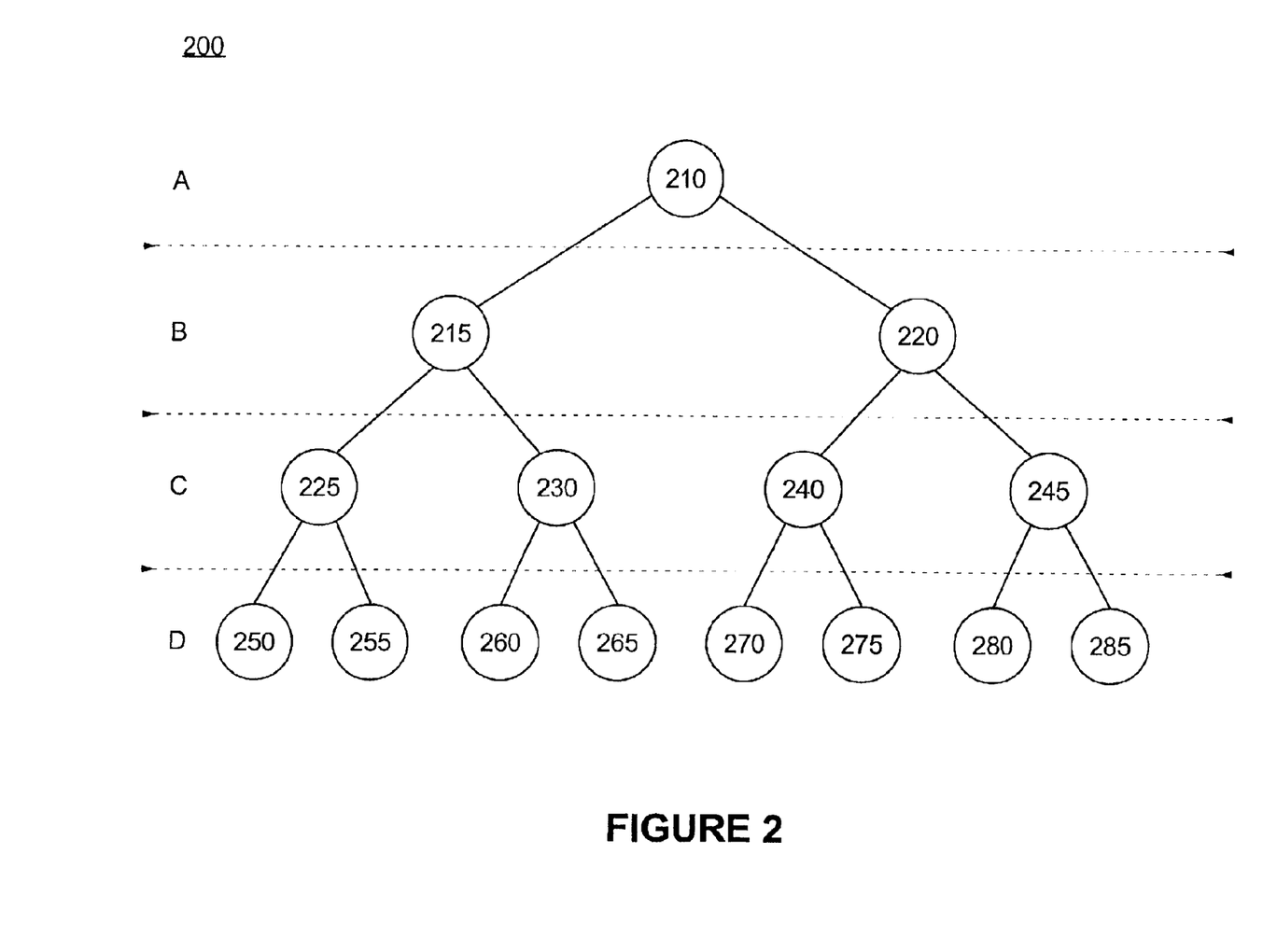
FIG. 2 is a pictorial representation of an exemplary decision network which can be used with the invention disclosed herein.

FIG. 2 is pictorial representation of the exemplary decision network 200 of FIG. 1. The decision network 200 can be an ordered or weighted set of queries, wherein each of the queries can be directed toward a particular feature of the data. Each node of the decision network 200 can correspond to a single query. Beginning at the root node 210 in level A, the queries can be organized from the most significant query to the least significant queries in level D. The least significant queries in level D can be called leaf nodes. The leaf nodes 250, 255, 260, 265, 270, 275, 280, and 285 have no other nodes descending below, referred to as children. Leaf nodes only have parents, or nodes from which the leaf nodes descend. The intermediate level B and C nodes 215, 220, 225, 230, 240, and 245 simply can be referred to as nodes. Notably, each node which is not a leaf or root node can have parent and child nodes. For example, node 215 is a child of root node 210 and a parent to nodes 225 and 230. The parent/child relationship can be extended from the root node 210 to the leaf nodes. Also, as shown in FIG. 2, the root node 210 has no parent node.

Figure 3:
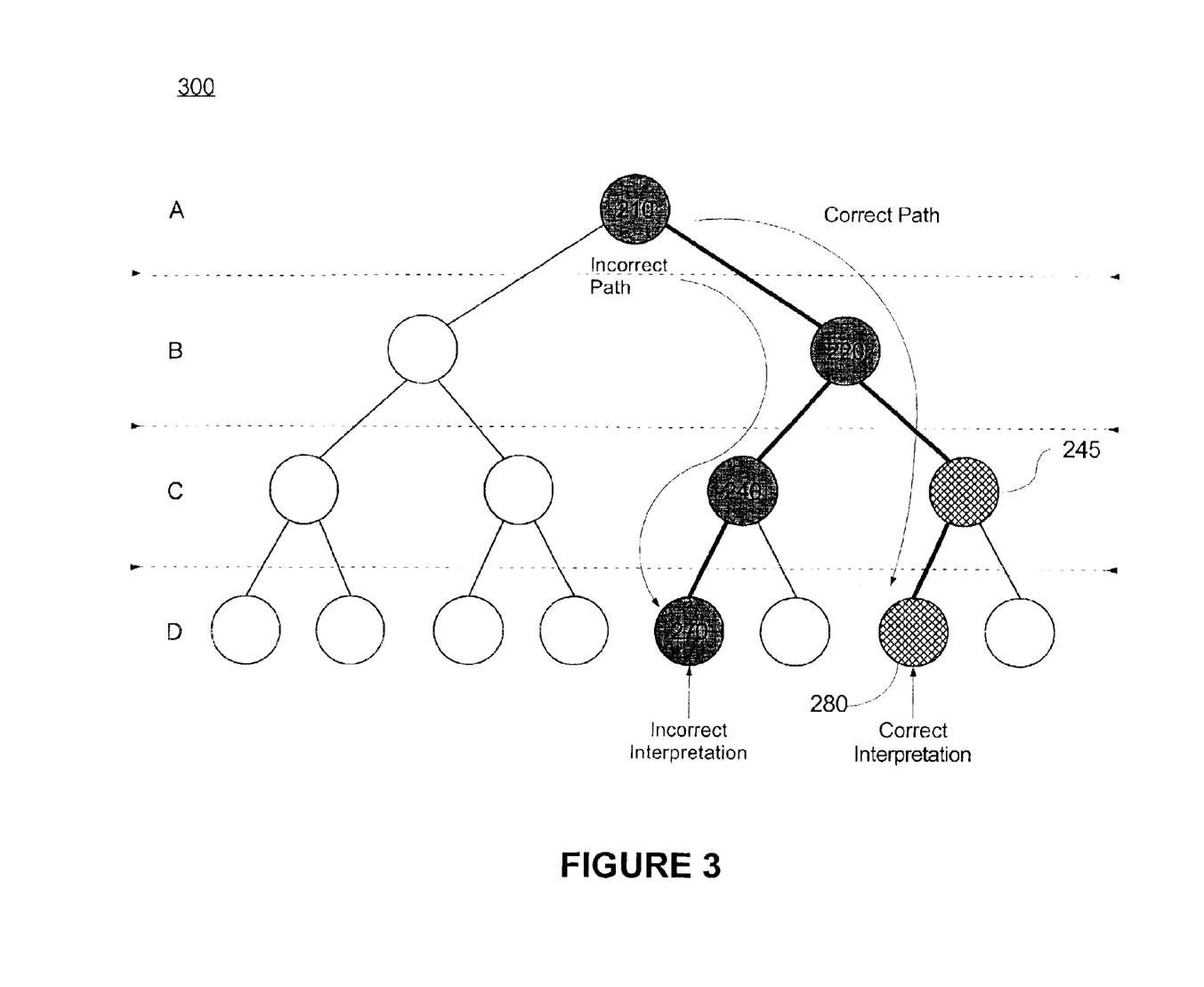
FIG. 3 is another pictorial representation of one aspect of the invention disclosed herein.

FIG. 3 is another pictorial representation of the exemplary decision network 200 of FIG. 2. Within the decision network 200, an incorrect path through the decision network comprising nodes 210, 220, 240, and 270 has been distinguished from the rest of the decision network. Similarly, a correct path comprising nodes 210, 220, 245, and 280 has been distinguished. As previously mentioned, the correct path through the decision network is one that can process a given data item, for example a portion of text or speech, such that the resulting interpretation corresponds to the truth. In that case, the decision network has produced a correct interpretation of the data. The incorrect path through the decision network produces an interpretation which deviates from the truth.

Through an analysis of the annotated data, including the incorrectly interpreted data item, the developer can identify one or more features of the data which can cause the decision network to produce an incorrect interpretation. With one or more features having been identified, the developer can formulate a new query directed at identifying those features. The new query can be incorporated within the decision network such that data items having one of the identified features can be correctly interpreted using the decision network.

For example, in the context of an NLU system for processing user queries directed to financial information, an exemplary text string can be "retirement strategy balance". This text string can be the name of a particular mutual fund in which the user is invested. Consequently, a correct interpretation or the truth labels the entire phrase as a fund name. Accordingly, interpreting the text string as asking the balance of a fund named "retirement strategy" is incorrect. The incorrect interpretation has closed the constituent "retirement strategy" rather than continue the constituent to include the word "balance". Thus, a developer can analyze the decision network responsible for this incorrect interpretation and formulate a new query designed to correctly parse the text string.

It should be appreciated that the invention can determine whether the inclusion of a new query within a decision network improves the system performance, i.e., makes a correct prediction with the greatest probability rather than an incorrect prediction. The determination can be made by calculating the improvement in a measure of goodness of the decision network resulting from the inclusion of the new query at each node of the identified incorrect path through the decision network. One example of a measure of goodness for discrete probability distributions which is known in the art is the conditional entropy commonly denoted as $H(X|Y)$. Another measure of goodness can be the log likelihood denoted as $L(X|Y)$. In any case, if the replacement of an old query with a new query at a particular node leads to an improvement in the measure of goodness attained using the old query, the new query can be used at that node. For example, such a process can be performed at node 220 wherein the incorrect path deviates from the correct path in the decision network of FIG. 3.

Notably, the same procedure can be performed using correct paths in an effort to increase system performance. For example, achieving a correct interpretation of the data using fewer queries. If the new query does not produce a satisfactory result, the new query need not be included within the decision network. In that case, the decision network need not be retrained.

Figure 4:
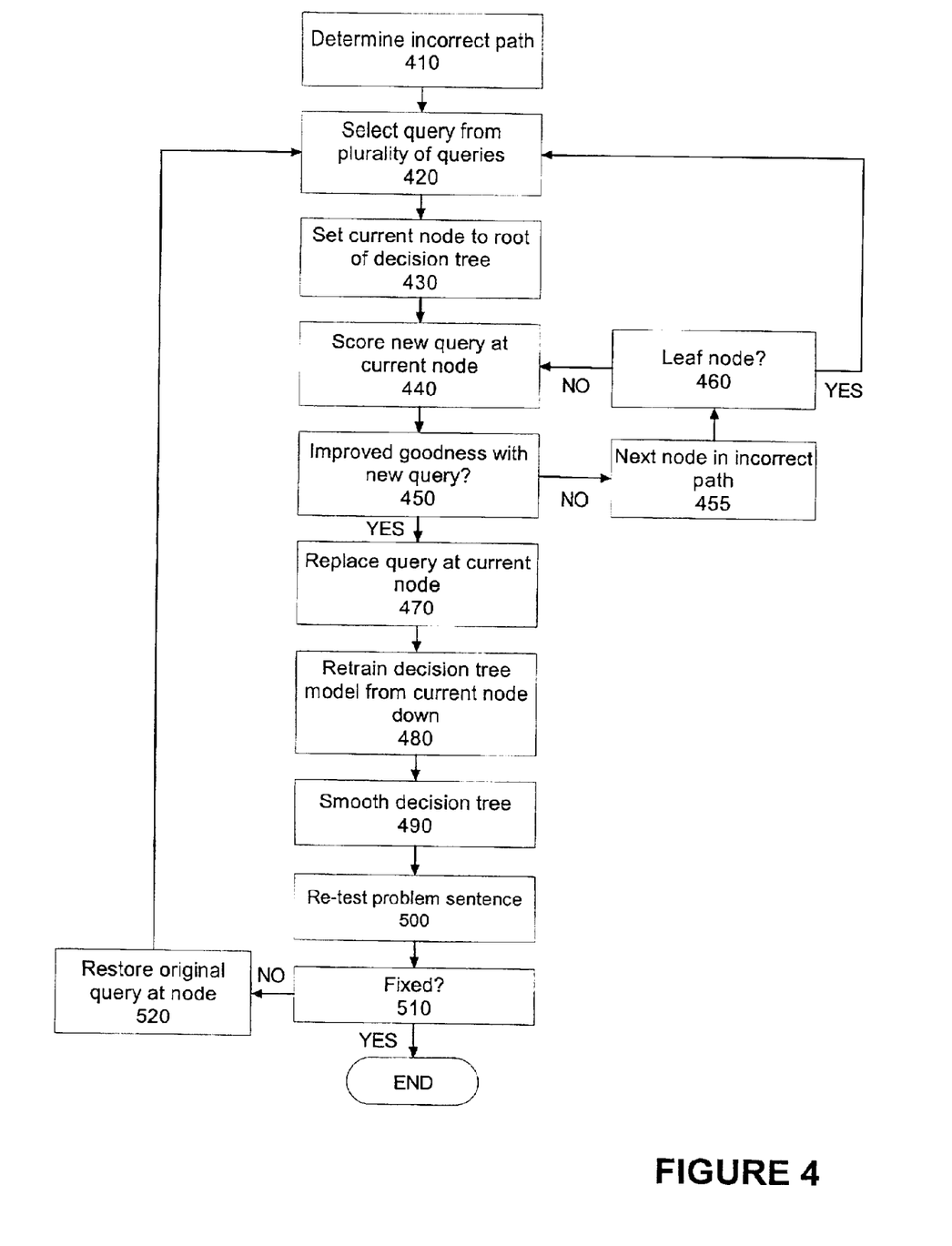
FIG. 4 is a flow chart illustrating an exemplary method of the invention.

FIG. 4 is an exemplary method 400 for tuning a decision network as performed by the NLU development system 135 of FIG. 1. The method of the invention can begin in a state wherein a decision network has been built and a known data item has been processed thereby producing an interpretation of that data item. Subsequently, a distinction between the system interpretation and the truth can be determined.

In step 410, the path traversed through the decision network resulting in the deviation in the system generated interpretation from the truth can be identified. In step 420, the first of a plurality of potentially useful new queries, which can be formulated by a developer, can be selected. In step 430, the current node of the decision network can be set to the root of the decision network.

In step 440, the selected new query can be evaluated at the current node in place of the old or existing query to determine whether the measure of goodness at that node improves. In step 450, if the measure of goodness improves, the method can continue to step 470. If not, the method can continue to step 455 where the method can proceed to the next node in the incorrect path. At step 460, a determination can be made as to whether the next node is a leaf node. If so, the method can continue to step 420 to begin the process anew with another new query. If the next node is not a leaf node, the method can continue to step 440 where the selected new query can be applied to the next node of the incorrect path through the decision network. Accordingly, from step 460, the method can continue to step 440 and repeat until a useful query is determined or the incorrect path of nodes is exhausted.

At step 470, if the measure of goodness improved in step 450, the new query can be used as a replacement for the old query at the current node of the decision network. In step 480, the decision network can be retrained from the current node down through the leaves of the network. As is known in the art, conventionally, a decision network can be retrained by examining all queries and scoring each with a measure of goodness on the training data and sorting the queries accordingly. After selecting the query with the best level of goodness, the training data can be split by applying the query to the training data. For example, training data resulting in a "yes" answer can be used to retrain the decision network from the "yes" branch down through the leaves. Training data resulting in a "no" answer can be used to retrain the decision network from the "no" branch down through the leaves. The network can be regrown by recursively applying this technique. Accordingly, using the present invention, the decision network can be retrained from the current node down through the leaves of the decision network. This can be performed using the training data corresponding to the current node rather than retraining the entire network, including those unchanged portions above the current node.

After retraining the decision network, in step 490 the decision network can be statistically smoothed. In step 500, the resulting decision network can be tested by applying the newly derived decision network to the data item which was originally misinterpreted. If in step 510 the data item is correctly interpreted, the method can end. If not, the method can continue to step 520 to restore the original query at the current node and loop back to step 420 where a next new query can be selected and the process can repeat. Thus, through the iterative process, new queries can be applied to each node within the incorrect path traversed through the decision network.

If more than one new query is identified as resulting in an improved measure of goodness than what was achieved using the old query at a node, the NLU development system can determine the degree of separation produced by each identified query. In that case, other data items having identical or similar features or interpretations can be located within the training data. Each new query can be applied to the identical or similar data items. Accordingly, for each new query resulting in an improved measure of goodness at the current node, a ratio of the correct interpretations of the identical and similar data item to the total number of identical or similar data items can be calculated. The new query having the highest ratio, or measure of separation, can be used at the current node.

In an alternate aspect of the invention, a node of the decision network causing the system determined interpretation to deviate from the truth can be identified. For example, node 220 of FIG. 3 can be identified as the last common node between a correct and the incorrect path. In that case, the new queries can be applied directly at node 220. In this manner, the decision network can be tuned or debugged directly at the node causing the incorrect parse, rather than along the entire incorrect path. Additionally, as mentioned, the exemplary method disclosed herein can be applied to a correct path to further improve a decision network.

The invention disclosed herein further can present a graphical illustration of the decision network, or a portion thereof, to a developer using a GUI. Notably, the decision network can be comprised of a multitude of levels. Accordingly, the decision network can be presented in a GUI wherein the developer can zoom into and out of the decision network. For example, FIGS. 2 and 3 can be illustrative of the structure of a decision network which can be displayed within the GUI. Actual decision networks, however, can be much larger than the illustration. In consequence, it can be beneficial to zoom in and out of the decision network, or display portions of the entire model as required during editing.

The GUI further can display decision network information such measure of goodness information including the reduction in conditional entropy or gain in log likelihood achievable from both the old and new queries at each node in addition to the actual queries themselves. For example, this information can be displayed in a separate window when a node of a decision network is highlighted, or alternatively, can be displayed as a tool tip as a pointer is moved over a node. Still, the invention is not limited to the particular manner in which such information can be presented to a user or developer. Other information such as training data information, whether that information corresponds to a node of the decision network or not, can be displayed.

Such information can include the number of data items at a particular node and the histogram or probability distribution at a particular node. Other features can include displaying histograms at nodes having a minimum amount of training data associated with the node.

Using the method of the invention, the developer can view a path corresponding to an incorrect interpretation as well as paths corresponding to the truth. Moreover, developers can view and zoom in on the location in the decision network wherein the incorrect path deviated from a correct path or truth. Additionally, the correct and incorrect paths through the decision network can be graphically illustrated wherein the developer can zoom in and out of the graphical representation.

What is claimed is:

1. Within an information processing system, a computerized method of tuning a decision network for classifying data items comprising:

identifying a deviation between a correct interpretation of a data item and an incorrect interpretation of said data item;

in a decision network comprising a hierarchical set of nodes and leaves, determining a path of traversed nodes in said decision network resulting in said deviation, wherein said nodes correspond to queries;

calculating a measure of goodness at a node in said path using at least one new query as a replacement for an existing query to determine whether said measure of goodness improves using said at least one new query compared to said old query; and if said measure of goodness improves, selecting said at least one new query and regrowing said decision network from said node down through said leaves using said at least one new query at said node, thereby resulting in an updated decision network.

2. The method of claim 1, wherein said measure of goodness is a measure of conditional entropy or log likelihood.

3. The method of claim 1, wherein said regrowing step includes smoothing said decision network.

4. The method of claim 1, further comprising:

testing said regrown decision network using said data item.

5. The method of claim 1, wherein said measure of goodness is calculated at a node that is common to a path resulting in said correct interpretation and common to a path resulting in said incorrect interpretation.

6. The method of claim 1, wherein said decision network is a decision tree model.

7. The method of claim 1, further comprising:

presenting at least a portion of said decision network in a graphical user interface wherein at least one node from at least one of said paths is distinguished from other nodes of said decision network.

8. The method of claim 7, said presenting step further comprising:

distinguishing at least one node of said first path from at least one node of said second path.

9. The method of claim 7, said presenting step further comprising:

distinguishing a node common to said first path and said second path.

10. The method of claim 7, said presenting step further comprising:

presenting decision network information selected from the group consisting of query information and training data information.

11. The method of claim 1, wherein if at least two new queries result in an improved measure of goodness, determining a measure of separation in said decision network using each of said queries resulting in said improved measure of goodness.

12. A method of tuning a decision network comprising:

in a decision network comprising a hierarchical set of nodes and leaves, identifying a path of nodes traversed through said decision network resulting in an interpretation of a data item, wherein said nodes correspond to existing queries;

calculating a measure of goodness at a node in said path using a new query as a replacement for one of said existing queries; and if said new query results in an improved measure of goodness compared to said existing query, retraining said decision network using said new query at said node beginning with said node through said leaves of said decision network.

13. The method of claim 12, wherein said decision network is a decision tree model.

14. The method of claim 12 further comprising displaying one or more nodes of at least one path in said decision network resulting in a correct interpretation of a data item.

15. The method of claim 14, wherein displaying one or more nodes of at least one path in said decision network results in an incorrect interpretation of said data item.

16. The method of claim 14, wherein said decision network is a decision tree model.

17. A machine-readable storage, having stored thereon a computer program having a plurality of code sections executable by a machine for causing the machine to perform the steps of:

identifying a deviation between a correct interpretation of a data item and an incorrect interpretation of said data item;

in a decision network comprising a hierarchical set of nodes and leaves, determining a path of traversed nodes in said decision network resulting in said deviation, wherein said nodes correspond to queries;

calculating a measure of goodness at a node in said path using at least one new query as a replacement for an existing query to determine whether said measure of goodness improves using said at least one new query compared to said old query; and if said measure of goodness improves, selecting said at least one new query and regrowing said decision network from said node down through said leaves using said at least one new query at said node.

18. The machine-readable storage of claim 17, wherein said measure of goodness is a measure of conditional entropy or log likelihood.

19. The machine-readable storage of claim 17, wherein said regrowing step includes smoothing said decision network.

20. The machine-readable storage of claim 17, further comprising:

testing said regrown decision network using said data item.

21. The machine-readable storage of claim 17, wherein said measure of goodness is calculated at a node that is common to a path resulting in said correct interpretation and common to a path resulting in said incorrect interpretation.

22. The machine-readable storage of claim 17, wherein said decision network is a decision tree model.

23. The machine-readable storage of claim 17, further comprising:

presenting at least a portion of said decision network in a graphical user interface wherein at least one node from at least one of said paths is distinguished from other nodes of said decision network.

24. The machine-readable storage of claim 23, said presenting step further comprising:

distinguishing at least one node of said first path from at least one node of said second path.

25. The machine-readable storage of claim 23, said presenting step further comprising:

distinguishing a node common to said first path and said second path.

26. The machine-readable storage of claim 23, said presenting step further comprising:

presenting decision network information selected from the group consisting of query information and training data information.

27. The machine-readable storage of claim 17, wherein if at least two new queries result in an improved measure of goodness, determining a measure of separation in said decision network using each of said queries resulting in said improved measure of goodness.

28. A machine-readable storage, having stored thereon a computer program having a plurality of code sections executable by a machine for causing the machine to perform the steps of:

in a decision network comprising a hierarchical set of nodes and leaves, identifying a path of nodes traversed through said decision network resulting in an interpretation of a data item, wherein said nodes correspond to existing queries;

calculating a measure of goodness at a node in said path using a new query as a replacement for one of said existing queries; and if said new query results in an improved measure of goodness compared to said existing query, retraining said decision network using said new query at said node beginning with said node through said leaves of said decision network.

29. The machine-readable storage of claim 28, wherein said decision network is a decision tree model.

* * * * *